(12) United States Patent
Callaway et al.

(10) Patent No.: US 7,352,920 B2
(45) Date of Patent: Apr. 1, 2008

(54) MANAGING IMAGES OF MICROSCOPIC SPECIMENS

(75) Inventors: W. Scott Callaway, San Diego, CA (US); Edward A. Hunter, San Diego, CA (US)

(73) Assignee: Q3DM, LLC, San Diego, CA (US)

( * ) Notice: Subject to any disclaimer, the term of this patent is extended or adjusted under 35 U.S.C. 154(b) by 20 days.

(21) Appl. No.: 10/228,759

(22) Filed: Aug. 26, 2002

(65) Prior Publication Data

US 2003/0033090 A1 Feb. 13, 2003

Related U.S. Application Data

(63) Continuation of application No. 09/703,455, filed on Oct. 31, 2000, now abandoned.

(60) Provisional application No. 60/177,111, filed on Jan. 20, 2000.

(51) Int. Cl.
*G06K 9/78* (2006.01)
*G06K 9/00* (2006.01)
*G06F 19/00* (2006.01)

(52) U.S. Cl. ............... 382/305; 382/282; 382/286; 382/128; 382/133; 702/19

(58) Field of Classification Search ............ 702/21, 702/155; 382/280, 282, 305, 128, 133
See application file for complete search history.

(56) References Cited

U.S. PATENT DOCUMENTS 5,313,575 A 5/1994 Beethe
5,504,917 A 4/1996 Austine
6,215,892 B1 * 4/2001 Douglass et al. ........... 382/128
2004/0085443 A1 * 5/2004 Kallioniemi et al. ....... 348/135

OTHER PUBLICATIONS

Konstantinos, K. and Rasure, J. HPL Technical Report 92-96 (1992) "The Khoros Software Development Environment for Image and Signal Processing".*
Halse, M.A. et al, "Release 2 Manual", Iris Explorer User's Guide, 'Online! Xp002171282 URL:http://www/gatech.edu/scivis/Iris/doc/ug/front.html, 1997.
Khoral Research: "Khoros Manual", Advanced Khoros Manuals, 'Online! Jan. 1, 1997, XP002171281 URL:http://www/ee/byu.edu/support/khoros2.2/topmost_toc.html.
Wang, R., "Interactive Visualization And Programming—A 3D Vector Field Visualization System", IEEE Trans Magnetics, vol. 29, No. 2, Mar. 1, 1993 XP00217283.
International Search Report for PCT/US101/01928, 2001.
Konstantinos, K., et al., HPL Technical Report 92-96 (1992), "The Khoros Software Development Environment for Image and Signal Processing".

* cited by examiner

*Primary Examiner*—Lori A. Clow
(74) *Attorney, Agent, or Firm*—Birch, Stewart, Kolasch & Birch, LLP.

(57) ABSTRACT

A method for managing a digital image of a biological specimen is disclosed. The method includes storing image data in a storage device. The image data is data for showing the image on a display. The method also includes identifying a portion of the image to be processed and transferring a first portion of the image data from the storage device to a working memory. The first portion of the image data is a portion of the image data for displaying the identified portion of the image on the display.

35 Claims, 12 Drawing Sheets

MANAGING IMAGES OF MICROSCOPIC SPECIMENS

RELATED APPLICATION

This application is a continuation of U.S. patent application Ser. No. 09/703,455, filed Oct. 31, 2000 now abandoned, which claims the benefit of U.S. Provisional Application No. 60/177,111, filed Jan. 20, 2000 and entitled "A Software Framework for Scanning Cytometry," which is incorporated herein in its entirety.

BACKGROUND

1. Field of the Invention

The invention relates generally to images of specimens. In particular, the invention relates to management of specimen images.

2. Background of the Invention

An image of a biological specimen can be a useful tool in diagnosing a variety of pathological conditions. For instance, images of biological specimens can reveal cells in the process of dividing. Since cancer is characterized by rapidly dividing cells, an image showing an unusually large number of cells dividing can indicate the presence of cancerous cells.

Images of biological specimens are often stored in a digital form so they can be easily displayed for manipulation and study. For instance, displaying an image on a computer display device allows an operator to scroll to and/or zoom in on regions of interest.

In order for an image of a biological specimen to include information about the cells in the specimen, the image must be generated using a high degree of magnification. Due to this high degree of magnification, a typical imaging device is only able to display an image of a small region of the specimen. The image of this small region may not contain enough information to be useful to an observer. As a result, an image of a biological specimen is often created by piecing together images of adjacent regions of the specimen to form a larger image.

Computers displaying an image stored on a hard disk generally copy the image data from the disk drive into RAM before displaying the image. The computer then works from the image data copied into RAM when displaying the image. However, since images of biological specimens are often constructed from several smaller images, these images often require an amount of memory which exceeds the amount of available RAM or is otherwise not convenient to maintain completely in RAM. As a result, an image of a biological specimen can be difficult or even impossible to display. For the above reason, there is a need for methods of effectively managing the image data for biological images.

SUMMARY OF THE INVENTION

The invention relates to a method for managing an image of a biological specimen. The method includes storing image data in a storage device. The image data is data for processing of the image. The method also includes identifying a portion of the image to be processed and transferring a first portion of the image data from the storage device to a working memory. The first portion of the image data is the portion of the image data for processing the identified portion of the image.

Processing of the image can include, but is not limited to, displaying of the image on a display, enhancing the image, identifying features on the image, making measurements and other processing.

The method for managing the image can also include freeing a second portion of the image data from the working memory. The second portion of the image data is image data that is not needed for processing the identified portion of the image.

In one embodiment of the method, identifying a portion of the image to be processed includes identifying one or more regions of the image. The identified regions of the image are regions where at least a portion of the identified region is to be processed. The image data for each of the identified regions is transferred from the storage device to the working memory.

In another embodiment of the method, identifying a portion of the image to be processed includes identifying one or more areas of interest on the image. The identified areas of interest are areas where at least a portion of the area is to be processed. The image data for each of the identified areas of interest is transferred from the storage device to the working memory.

The invention also relates to a machine readable medium having instructions executable by a processing apparatus to perform one or more methods according to the present invention.

The invention also relates to a data structure for processing an image of a specimen. The data structure includes a plurality of secondary elements each of which indicates a location within a storage device of image data. The image data is data for processing an area of interest within the image of the biological specimen. The data structure also includes a plurality of primary elements each of which is associated with secondary elements. The primary elements indicate the location within the storage device of image data for an area of interest which is located within a region of the image.

DETAILED DESCRIPTION OF THE PREFERRED EMBODIMENT

The present invention relates to a method of managing an image of a specimen. Image data needed for processing the image is stored in a storage device. Examples of processing the image include, but are not limited to, displaying the image on a display, enhancing the image, identifying features on the image, making measurements of image features and other processing. When the specimen image is to be processed, the system identifies the portion of the image to be processed. The image data corresponding to the identified portion of the specimen image is copied from the storage device into a working memory. As a result, the image data transferred into the working memory is primarily image data for the portion of the specimen image to be processed. Accordingly, all of the image data in the storage device is not copied into the working memory leaving more of the working memory available for the various functions of the system. The system works from the image data transferred into the working memory to process the image.

The system can also identify image data which is present in the working memory but is not needed to process the identified portion of the specimen image. The system can free the identified image data from the working memory to free the working memory for additional image data which might be transferred into the working memory in response to the displayed image being scrolled, magnified or shrunk.

In one embodiment of the invention, the areas of interest in the specimen image are identified. Image data for the identified areas of interest is stored in the storage device. When the image is to be processed, the system identifies the areas of interest which will be included in the processing. The image data which corresponds to the identified areas of interest is copied from the storage device into a working memory. The image to be processed is generated from the image data for the areas of interest that is transferred into the working memory. The identified areas of interest can be a fraction of the total image area. Accordingly, the image data for the areas of interest can be a fraction of the image data for the entire image. As a result, the amount of image data transferred into the working memory when the areas of interest are identified can be less than when the areas of interest are not identified. Hence, identification of the areas of interest can free up additional space in the working memory and/or allow a larger portion of the image to be processed.

Figure 1:
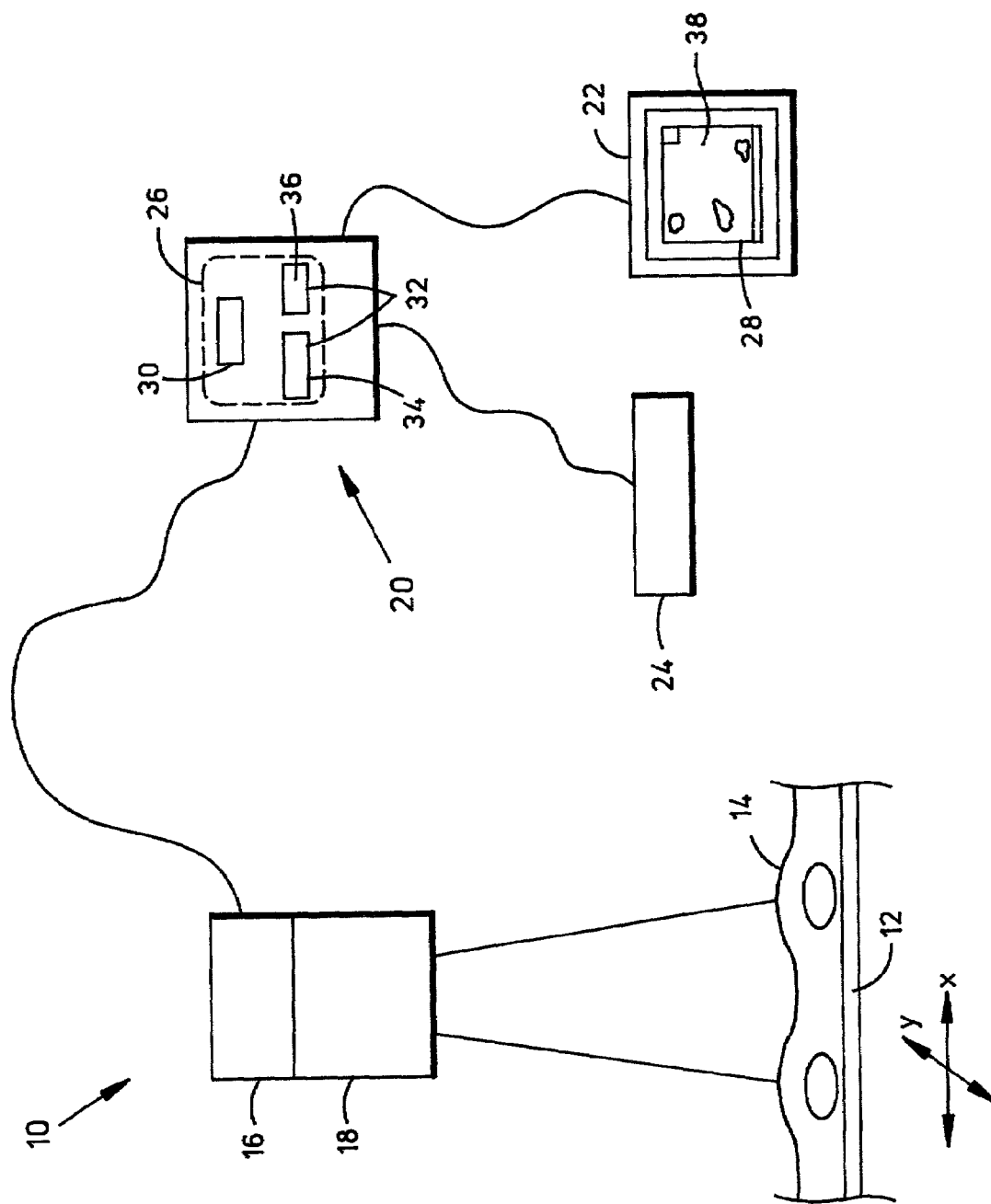
FIG. 1 illustrates a system for imaging a biological specimen.

FIG. 1 illustrates a system 10 for imaging and/or viewing of a specimen 14. The system 10 includes a stage 12 where a specimen 14 can be positioned. An imaging device 16 views the specimen 14 through an optics assembly 18. The imaging device 16 is configured to generate an image of the specimen 14 and can be moved relative to the specimen 14. Moving the imaging device 16 relative to the stage 12 can include moving the stage 12 while holding the imaging device 16 stationary or moving the imaging device 16 while holding the stage 12 stationary. As a result, the imaging device 16 can be moved so it views different regions of the specimen 14. The imaging device 16 can then generate an image of each of these different regions. Suitable imaging devices 16 include, but are not limited to, area cameras. The optics assembly 18 controls the focal plane of the imaging device 16 such that the imaging device 16 is focused on a surface of the specimen 14 of at a particular depth within the specimen 14.

The system 10 also includes a processing unit 20 in communication with the imaging device 16, a display 22 and one or more user interfaces 24. The processing unit 20 houses electronics 26 for controlling various operations of the system 10. For instance, the electronics 26 can control movement of the imaging device 16 relative to the specimen 14. The display 22 can be used to show at least a portion of one or more specimen images 38 which have been generated by the system 10. The displayed image is visible to an operator in a display area. The display 22 can also be used to indicate a variety of system 10 conditions to the operator.

An operator can use the one or more user interfaces 24 to interact with the system 10 and vary system parameters. For instance, an operator can use a user interface to manipulate the display area 28. The operator can change the portion of a specimen image 38 which is visible by scrolling to a new portion of the specimen image 38, zooming in and/or zooming out on the specimen image 38. A suitable user interface includes, but is not limited to, a keyboard and a mouse. Although a single processing unit 20, one or more user interfaces 24 and display 22 are illustrated, the system 10 can include a plurality of processing units 20, displays 22 and user interfaces 24.

The electronics 26 can include one or more processors 30 for performing instructions stored or carried on a machine readable medium 32. Suitable processors 30 include, but are not limited to, programmed general purpose digital computers, microprocessors, digital signal processors (DSP), integrated circuits, application specific integrated circuits (ASICs), logic gate arrays and switching arrays.

The one or more processors 30 are in communication with one or more working memories 34 and one or more storage memories 36. Suitable working memories 34 include, but are not limited to, volatile memories such as RAM and other memories from which a processor primarily works during execution of instructions. Suitable storage memories 36 include, but are not limited to, nonvolatile memories such as a disk drive.

The working memory and/or the storage device are examples of or contain machine readable media which store data developed during operation of the system 10 and/or instructions to be executed by the one or more processors 30. Other machine readable media which can serve as the working memory and/or the storage device include, but are not limited to, optical discs such as a compact disk (CD), CDROM, CD-R (a recordable CD-ROM that can be read on a CD-ROM drive), CD-RW (multiple-write CD), CD-E (recordable and erasable CD), or DVD (digital video disc). Alternatively, instead of, or in addition to an optical disc, the machine readable media can include one or more of the following: a magnetic data storage diskette (floppy disk), a Zip disk, DASD storage (e.g., a conventional "hard drive" or a RAID array), magnetic tape, RAM, electronic read-only memory (e.g., ROM, EPROM, or EEPROM), paper punch cards, or transmission media such as digital and/or analog communication links.

In some instances, one or more of the machine readable media are positioned outside or remote from the processing unit 20. For instance, the machine readable medium 32 may be part of, or may be connected to, a server computer that is connected to a network, in order to make the machine-readable code available to other computers. The network may be a local area network (LAN), a wide area network (WAN), or any other type of network. This arrangement enables one or more other computers connected to the network to copy instructions and/or data from the machine readable medium 32 that is part of, or connected to, the (server) computer, to a machine readable medium 32 that is part of, or connected to, the processing unit 20. This may be accomplished, for example, by connecting computers from one or more networks, over the Internet.

In other instances, the machine readable medium 32 may be part of, or may be connected to, a computer that is operating a bulletin board system 10 (BBS), which can be accessed by other computers. This arrangement enables the processing unit 20 to connect to the BBS and copy the instructions and/or data from the machine readable medium 32 that is part of, or connected to, the computer that is operating the BBS, to the machine readable medium 32 in communication with the processing unit 20.

Figure 2:
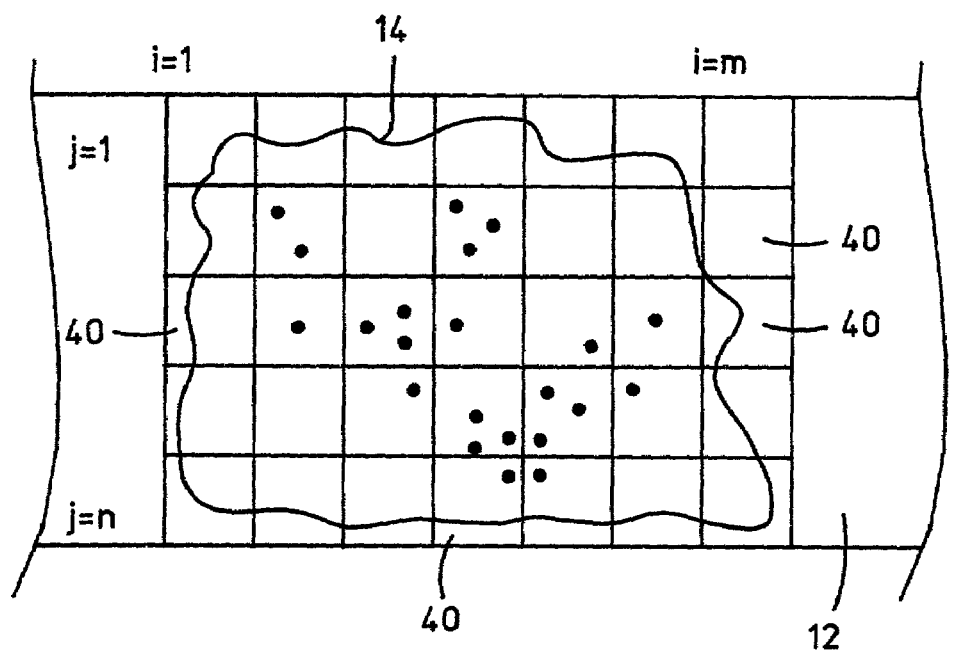
FIG. 2 illustrates a specimen positioned on a stage. The specimen is divided into a plurality of specimen regions.
Figure 3:
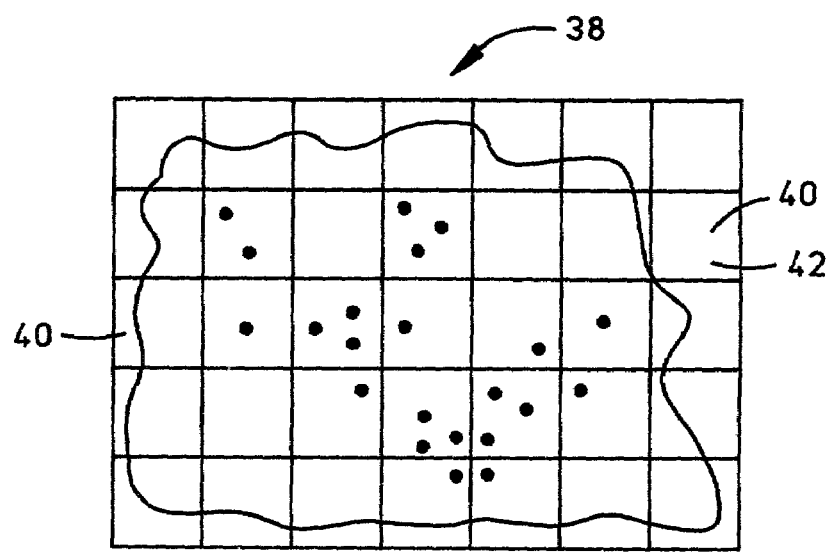
FIG. 3 illustrates an image of the specimen generated by generating an image of each specimen region.

FIGS. 2 and 3 illustrate how the system 10 generates a specimen image 38. A top view of the stage 12 is shown in FIG. 2. A biological specimen 14 is positioned on the stage 12. An image of the specimen 14 is generated by sequentially generating images of adjacent specimen regions 40. The imaging device 16 is moved so the imaging device 16 sequentially views each specimen region. The imaging device 16 generates an image of each specimen region. The processing unit 20 stores each specimen region image 42 in the storage device.

A specimen image 38 can be created by positioning the specimen region images 42 adjacent to one another as illustrated in FIG. 3. Similarly, an image of a portion of the specimen 14 can be created by positioning specimen region images 42 and/or portions of specimen region images 42 adjacent to one another. The specimen region images 42 are stored so each specimen region is associated with coordinates i, j where i=1 to m and j=1 to n as illustrated in FIG. 2. These coordinates can be used to identify which specimen region images 42 are to be positioned adjacent to one another when a specimen image 38 or a portion of the specimen 14 is being created.

Figure 4:
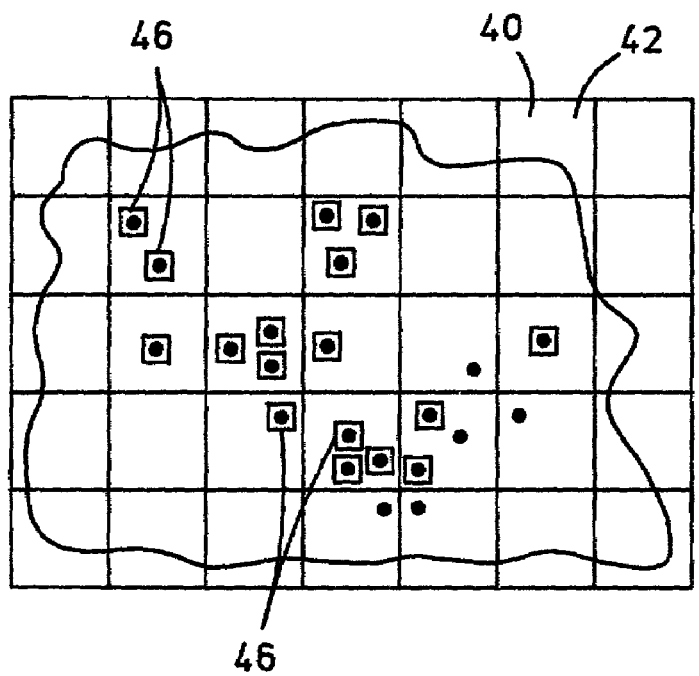
FIG. 4 illustrates the areas of interest in the image of FIG. 3.

The processing unit 20 can modify the specimen image 38 by identifying areas of interest 46 in the specimen image 38. FIG. 4 illustrates a selection of areas of interest 46 in the specimen image 38 of FIG. 3. The areas of interest 46 are portions of the image which satisfy one or more criteria. For instance, the areas of interest 46 can be the pixels of the specimen image 38 which are brighter than a threshold value. Before the specimen 14 is placed on the stage 12 the specimen 14 can be treated with fluorescent markers linked to binding agents. The binding agents can bind to the cells within a specimen 14. When the specimen 14 is illuminated the marker will fluoresce. Because the markers are bound to the cells, the cells appear as the brightest part of the specimen image 38. As a result, the areas of interest 46 mark the locations of the cells in the specimen image 38. The specimen image 38 can be modified to a specimen image 38 which includes only the areas of interest 46.

More than one selection of areas of interest 46 can be generated from a specimen image 38. For instance, the specimen 14 can be treated with different fluorescent markers which each fluoresce a different wavelength of light. Each type of marker can be linked to binding medium which binds a different type of cell. When the specimen 14 is illuminated, the cells of one type will fluoresce a different color than the cells of another type. A first selection of areas of interest 46 can include pixels which fluoresce a color of light associated with a first marker type. When this type of criterion is applied, the areas of interest 46 will mark the locations of a first cell type. A second selection of areas of interest 46 can be the pixels which fluoresce a color associated with a second marker type. The second areas of interest 46 will mark the locations of a second cell type. A specimen image 38 can be generated using both areas of interest 46. Alternatively, a specimen image 38 can be generated using the first selection of areas of interest 46 and another specimen image 38 can be generated using the second selection of areas of interest 46.

The possible criteria for generating areas of interest 46 above are intensity of light and color of light, however, other criteria can be applied. Additionally, more than one criteria can be applied to generate a selection of areas of interest 46.

Although an area of interest can include only the pixels which satisfy the applied criteria, the areas of interest 46 illustrated in FIG. 4 have a square shape. As a result, each area of interest probably includes pixels which do not meet the applied criteria. An area of interest can have other shapes such as triangular or circular. Further, an area of interest can include only the pixels which satisfy the applied criteria.

The dimensions of an area of interest can be a function of the number and arrangement of the pixels satisfying the one or more criteria. For instance, the dimensions of a square shaped area of interest surrounding a large number of pixels satisfying the one or more criteria can have a larger area of interest than a square shape area of interest surrounding a lower number of pixels satisfying the one or more criteria. Shapes other than square are suitable for an area of interest.

Figure 5:
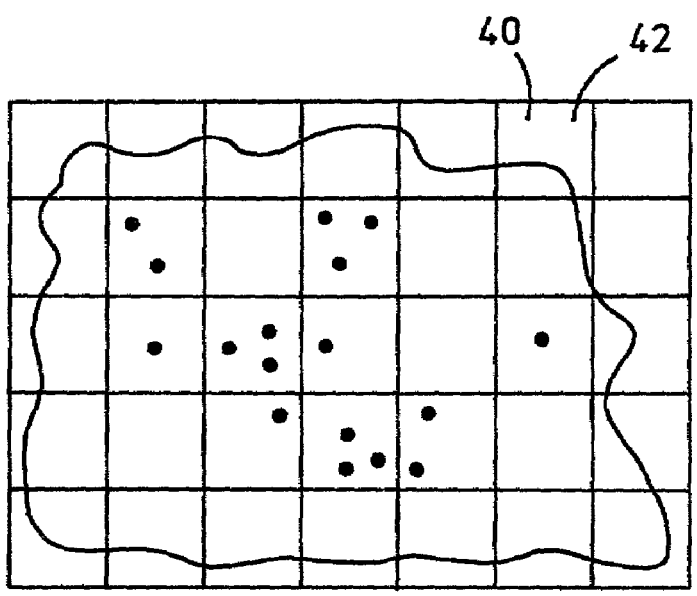
FIG. 5 illustrates a modified version of the image illustrated in FIG. 3.

The specimen image 38 of FIG. 3 can be modified by storing only the areas of interest 46 in the storage device and assigning the pixels of the image which are not included in an area of interest to a default color and intensity. For instance, FIG. 4 shows five spots which are not included in any area of interest. The pixels in these spots are assigned to a default condition. An example of a default condition is that any pixel which is not located in an area of interest appears as white. FIG. 5 is a modified version of the specimen image 38 of FIG. 4 using white as the default condition. Since the pixels which were not located in an area of interest were defaulted to white, the five spots identified above appear as background. Hence, if the areas of interest 46 indicated the location of a particular cell type, the other cell types do not show up in the modified image. As described above, more than one selection of areas of interest 46 can be generated for a single specimen image 38. As a result, multiple modified images can be generated from a single specimen image 38. For instance, a modified image can be generated which illustrates the locations of each type of cell present in the specimen image 38.

Figure 6:
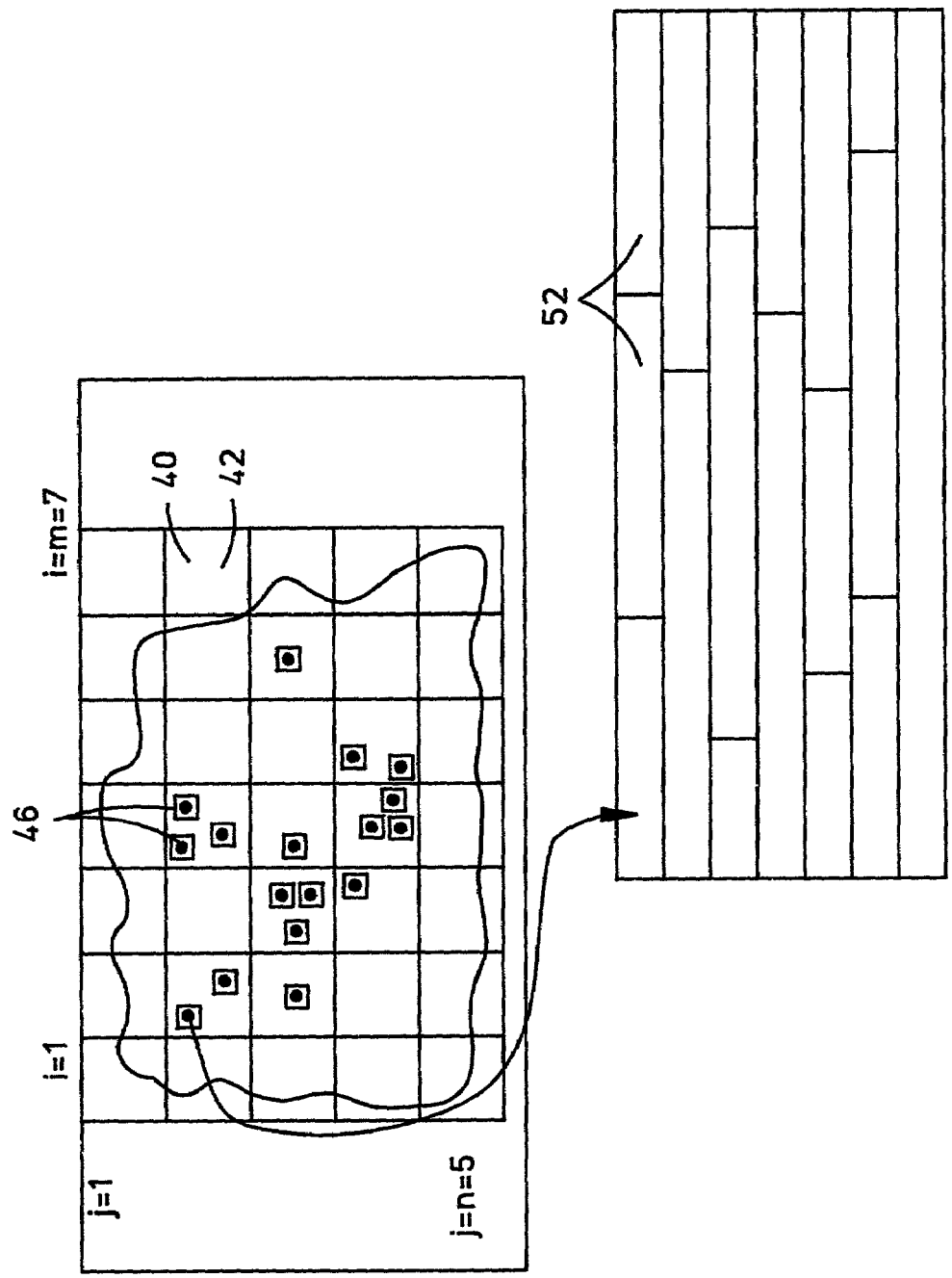
FIG. 6 illustrates how the image is stored in a storage device.

FIG. 6 illustrates how a modified specimen image 38 is stored in the storage device. Image data for each area of interest is stored in an image data field 52 having a particular location in the storage device. As a result, an image data field 52 is illustrated for each of the 17 areas of interest 46 illustrated in the specimen image 38 of FIG. 5.

Image data is data required for the processing of the image. For instance, when processing of the image includes displaying the image on a display, the image data is the data required for the processing unit 20 to re-create the specimen image 38 or a portion of the specimen image 38 on the display 22. The image data can include data about the color, intensity and location of each pixel of an image. One suitable method of storing image data is to store data for each specimen image 38 pixel located in an area of interest. The data is stored so each pixel location is associated with an area of interest and one or more optical characteristics. The location indicates the location of the pixel in the specimen image 38. The optical characteristics provide information about the appearance of the pixel such as the color and intensity of the pixel.

A display image 72 can be generated from the image data by identifying the pixels of the specimen image 38 which are within an area of interest and which fall within the display area 28. The portions of the display area 28, i.e. pixels of the display area 28, which correspond to one or more of the identified pixels in the specimen image 38 are provided with the optical characteristics associated with each of the associated pixels or with a combination of the optical characteristics associated with the identified pixels. The portions of the display area 28 that do not correspond to pixels in an area of interest are provided with the optical characteristics of the default condition.

Figure 7:
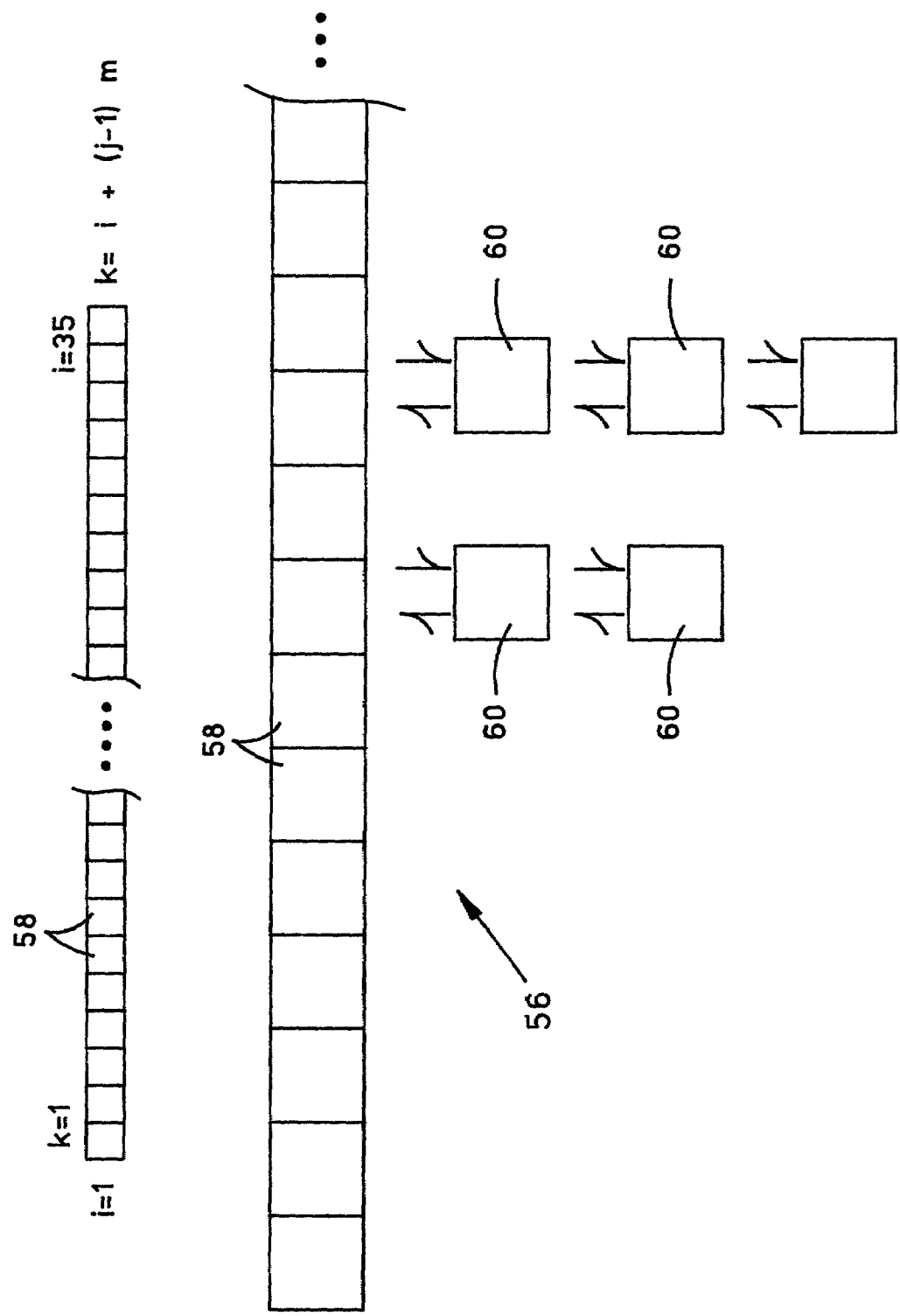
FIG. 7 is a data structure having one or more fields which are each associated a doubly linked list of elements. Each element indicating where image data for an area of interest on the specimen image is located in the storage device.

Also stored in the storage device is a data location data structure as illustrated in FIG. 7. The data location data structure includes a one dimensional linear array of memory cells with a number of primary elements 58, k, equal to the number of specimen region images 42 in a specimen image 38. Each primary element is associated with a specimen region image 42 according to Equation 1. At least a portion of each primary element 58 contains the header of a doubly linked list of secondary elements 60.

As will be described in more detail below, each secondary element contains a field for receiving the image data for a particular area of interest, i.e. by use of a pointer to dynamically allocated memory. As a result, each secondary element is associated with a particular area of interest. The secondary elements 60 which make up a doubly linked list are each associated with the areas of interest 46 which are located within a particular specimen region. As a result, each doubly linked list is associated with a particular specimen region, particularly, each doubly linked list is associated with the same specimen region as the primary element that serves as the header and manager of the doubly linked list. As a result, when the secondary elements 60 in a doubly linked list have each received image data, i.e. by dynamic memory allocation provided through operating system services followed by copying pixel values from the storage device into this newly allocated memory, the primary element linked to the doubly linked list and the doubly linked list include the image data for a particular specimen region.

For illustrative purposes, the data location data structure of FIG. 7 corresponds to the specimen image 38 of FIG. 5. The seven specimen regions 40 illustrated in the top row of the specimen image 38 illustrated in FIG. 5 do not include any areas of interest 46. Additionally, the first specimen region in the second row does not include an area of interest. As a result, there are no doubly linked lists linked to the first eight primary elements 58 in the data location data structure. The second and fourth specimen regions 40 in the second row respectively have two and three areas of interest 46. As a result, the ninth and eleventh primary elements 58 respectively have two and three secondary elements, one for each area of interest, doubly linked to one another.

$$k=i+(j-1)m \qquad (1)$$

Figure 8:
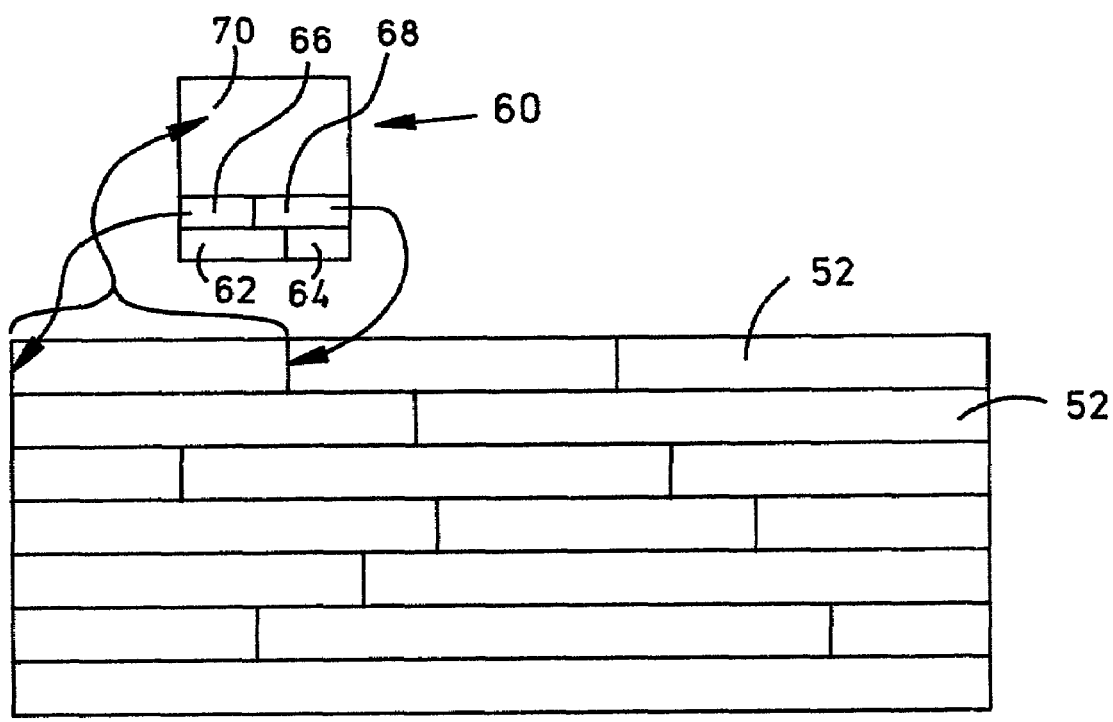
FIG. 8 illustrates the various fields of a secondary element of the data structure illustrated in FIG. 7.

FIG. 8 illustrates a secondary element having a plurality of fields. A first linking field 62 has a pointer to the location of the previous secondary element. When the secondary element is at the top of the doubly linked list, the pointer points to the location of the primary element which acts as the header of the doubly linked list. A second linking field 64 has a pointer to the location of the next secondary element. When the current secondary element is the final secondary element in the doubly linked list, this is indicated in the second linking field 64.

A location field 66 in the secondary element stores the location in the storage device of the image data for the area of interest associated with the secondary element. For the purposes of illustration, the secondary element illustrated in FIG. 8 is the first secondary element in the doubly linked list of the ninth field in the data location data structure. This secondary element holds a storage device location of an area of interest in the specimen region located at i=2, j=2. Specifically, this secondary element stores the location within the storage device of the data for the area of interest labeled A in FIG. 6. A length field 68 indicates the length of the data for the area of interest starting at the location indicated in the location field. For instance, the length field 68 can indicate the number of bits after the indicated location which have image data for the area of interest. Accordingly, the contents of the location field 66 and the length field 68 considered together indicate where the data for the area of interest associated with the secondary element is located in the storage device.

The secondary element also includes a data receiving field 70 holding a pointer to dynamically allocated working memory. During operation of the system 10, the image data identified in a particular location field 66 and the length field 68 can be transferred into the working memory. The data receiving field 70 can list an address indicating where the transferred image data is located in the working memory. When the data associated with the secondary element is not located in the working memory or is freed from the working memory, the data receiving field can be nulled.

The data location data structure discussed with respect to FIGS. 7 and 8 is two dimensional, however, it can have three or more dimensions. The additional dimensions can be another variable such as time, color or depth within the specimen. For instance, a single specimen 14 can be imaged over time. A two dimensional data location data structure can be generated for each specimen image 38 generated as time proceeds. The sequence of two dimensional data location data structures can be arranged in a three dimensional data location data structure.

The third dimension can also be for different depths within the specimen 14. Imaging systems 10 which generate a plurality of specimen images 38 at different depths within the specimen 14 are also available. For instance, U.S. patent application Ser. No. 09/235,215, filed on Jan. 22, 1999 now U.S. Pat. No. 6,640,014 and entitled Automatic On-The-Fly Focussing for Continuous Image Acquisition in High-Resolution Microscopy is incorporated herein in its entirety and teaches imaging systems 10 for generating a plurality of specimen images 38 at different depths within a specimen 14. A two dimensional data location data structure can be generated for each specimen image 38 generated at a different depth. The series of two dimensional data location data structures can be arranged in a three dimensional data location data structure. The third dimension can also relate to specimen images 38 generated by applying different criteria to the same original specimen image 38.

Figure 9A:
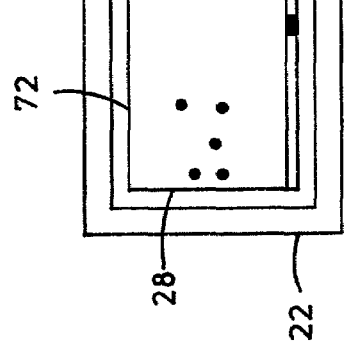
FIG. 9A illustrates a first portion of the image displayed on a display.
Figure 9B:
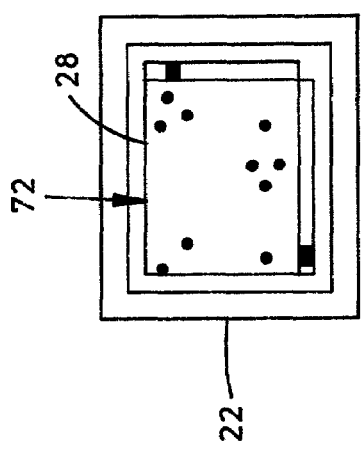
FIG. 9B illustrates a second portion of the image displayed on a display.

FIGS. 9A and 9B each illustrate a portion of the specimen image 38 shown on the display 22. The system operator can use the one or more user interfaces 24 to adjust the view of the display image 72. For instance, the operator can zoom in on the image or zoom out on the display image 72. Additionally, the operator can use scroll bars to look at different portions of the display image 72. For instance, the display image 72 of FIG. 9A shows a first portion of the specimen image 38. The operator scrolls from the first portion of the specimen image 38 to the portion of the specimen image 38 illustrated in FIG. 9B.

Figure 9C:
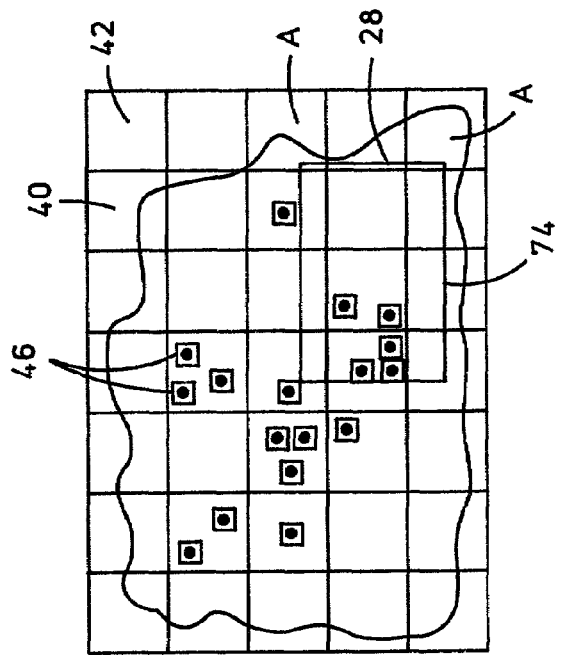
FIG. 9C illustrates the regions of the image which are needed to create the display image of FIG. 9A.
Figure 9D:
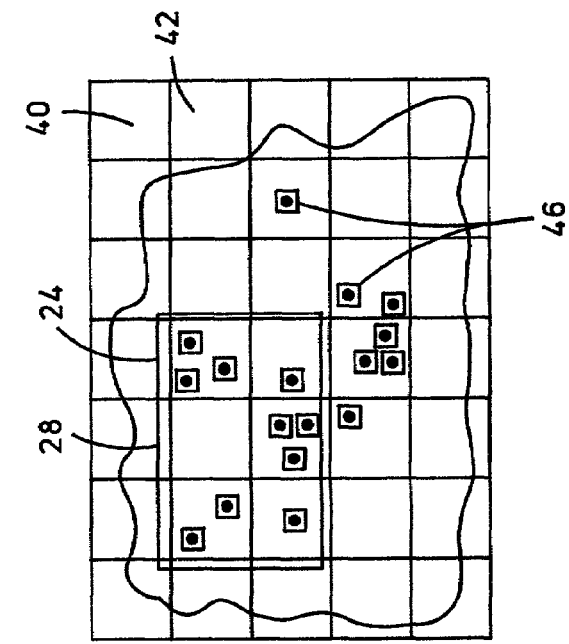
FIG. 9D illustrates the regions of the image which are needed to create the display image of FIG. 9B.

FIG. 9C illustrates a processing region 74 that outlines the portion of the specimen image 38 displayed on the display 22 of FIG. 9A. FIG. 9D illustrates a processing region 74 that outlines the portion of the specimen image 38 displayed on the display 22 of FIG. 9B. The processing region is the region of the specimen image to be processed. Scrolling of the display image 72 causes the specimen regions 40 within the processing region to change. Changing the magnification of the display image 72 can also cause the specimen regions 40 within the processing region to change. These changes change the areas of interest 46 that fall within the display area 28.

During operation of the system 10, the processing unit 20 identifies the areas of interest 46 that overlap the processing region 74 and transfers the image data for these areas of interest 46 from the storage device into the working memory. An example of a method for identifying and transferring the image data for the areas of interest 46 includes identifying the specimen region images 42 that overlap the processing region 74. For instance, the nine specimen regions 40 that overlap the processing region superimposed on the specimen image 38 of FIGS. 9C and 9D would be identified. The image data for the identified specimen regions 40 is transferred from the storage device into the working memory.

To transfer the image data from the storage device to the working memory, the processing unit 20 consults the primary elements 58 of the data location data structure which are associated with each of the identified specimen regions 40. The processing unit 20 then consults any secondary elements 60 linked to the primary elements 58 to find the location of the image data within the storage device. The processing unit 20 transfers the image data for each area of interest from the indicated location in the storage device into the image data field 52 of the associated secondary element. This method can result in image data for areas of interest 46 which are not needed for processing of the image to be transferred to the working memory. For instance, the areas of interest 46 labeled A in FIG. 9D have image data that is not needed to generate the image display of FIG. 9B. However, the processing unit 20 can examine the location of the pixels in each area of interest and then not use the image data for pixels which are not needed to generate the display image 72.

Transfer of the image data from storage device preferably does not include removal of the image data from the storage device although this is possible provided that the image data is transferred back from the working memory into the storage device.

The system 10 can also identify which specimen region images 42 are not needed for processing of the image. The system 10 can remove the image data for the identified regions from the working memory so the working memory is free for other purposes. Hence, the image data present in the working memory is primarily the data needed for processing of the image. As a result, the system working memory requirements are reduced.

Figure 10:
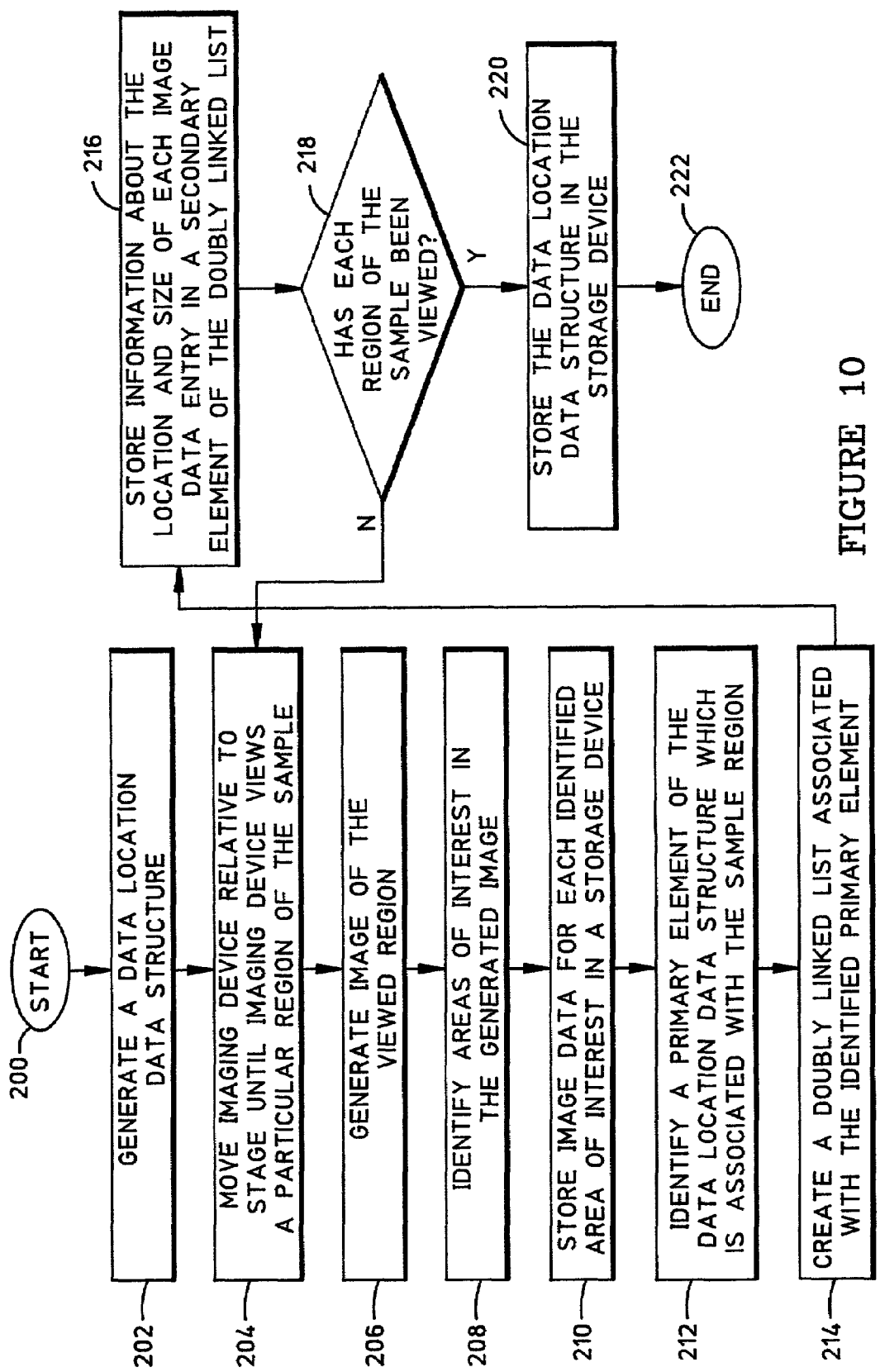
FIG. 10 illustrates a method for storing an image of a specimen in a storage device.

FIG. 10 illustrates an embodiment of a method for storing an image of a specimen 14 in a storage device. The method begins at start block 200 when an operator uses a user interface to indicate to the processing unit 20 that an image is to be created of a specimen 14 positioned on the stage 12. At process block 202 a data location data structure 56 is generated and maintained in the working memory. At process block 204 the imaging device 16 is moved relative to the stage 12 until the imaging device 16 has a view of a particular region of the specimen 14. At process block 206 an image is generated of the viewed region of the specimen 14. At process block 208 the areas of interest in the viewed region are identified. As described above, these areas can be identified by applying one or more criteria to the pixels of the region image. At process block 210 image data for each of the identified areas of interest is stored in the storage device. Each portion of image data is stored at a particular location in the storage device and has a particular length, i.e. occupies a particular number of bits of digital memory.

At process block 212 a primary element of the data location data structure 56 is identified which is associated with the viewed specimen region. As described above, the specimen regions 40 and the primary elements of the data location data structure 56 are related by Equation 1. Accordingly, Equation 1 can be used to identify the associated primary element. At process block 214 a doubly linked list is created and is doubly linked to the identified field of the data location data structure 56. At process block 216 the location and length of the image data for each identified area of interest is stored in a different secondary element of the doubly linked list.

At determination block 218 a determination is made whether each region of the specimen 14 has been viewed. When the determination is negative, the method returns to process block 204. When the determination is positive, the method proceeds to process block 220. At process block 220 the data location data structure 56 and the doubly linked list are stored in the storage device. The method terminates at end block 222.

The method illustrated in FIG. 10 is only one embodiment for a method for storing an image of the biological specimen 14 in a storage device. Many variations of the method are possible. For instance, more than one modified image can be created by applying different selections of one or more criteria to each region image. Additionally, the method can be used to store the entire specimen image 38 instead of particular areas of interest by treating the each specimen region as an area of interest.

Figure 11:
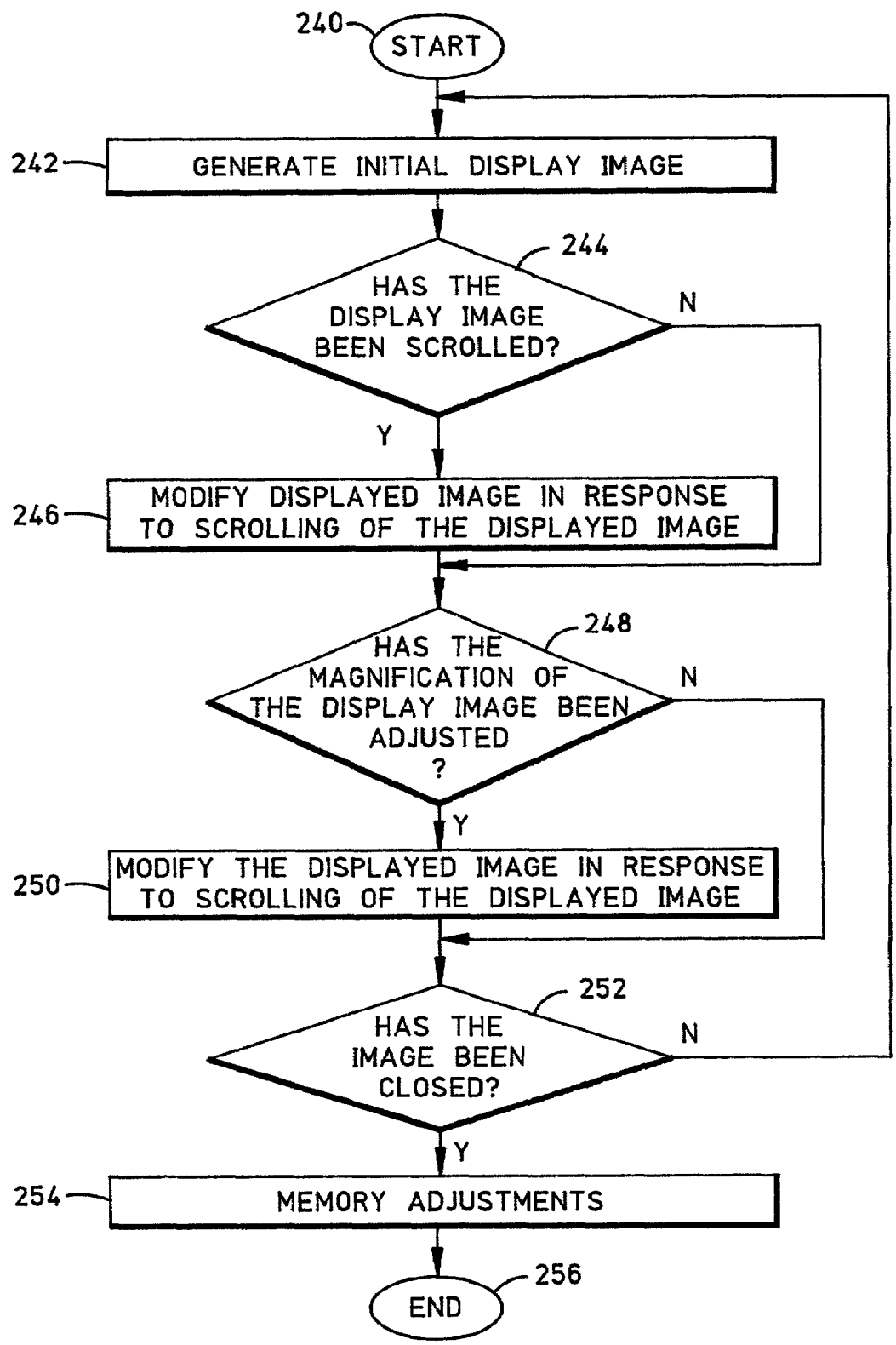
FIG. 11 illustrates a method for managing an image of a biological specimen on a display.
Figure 12:
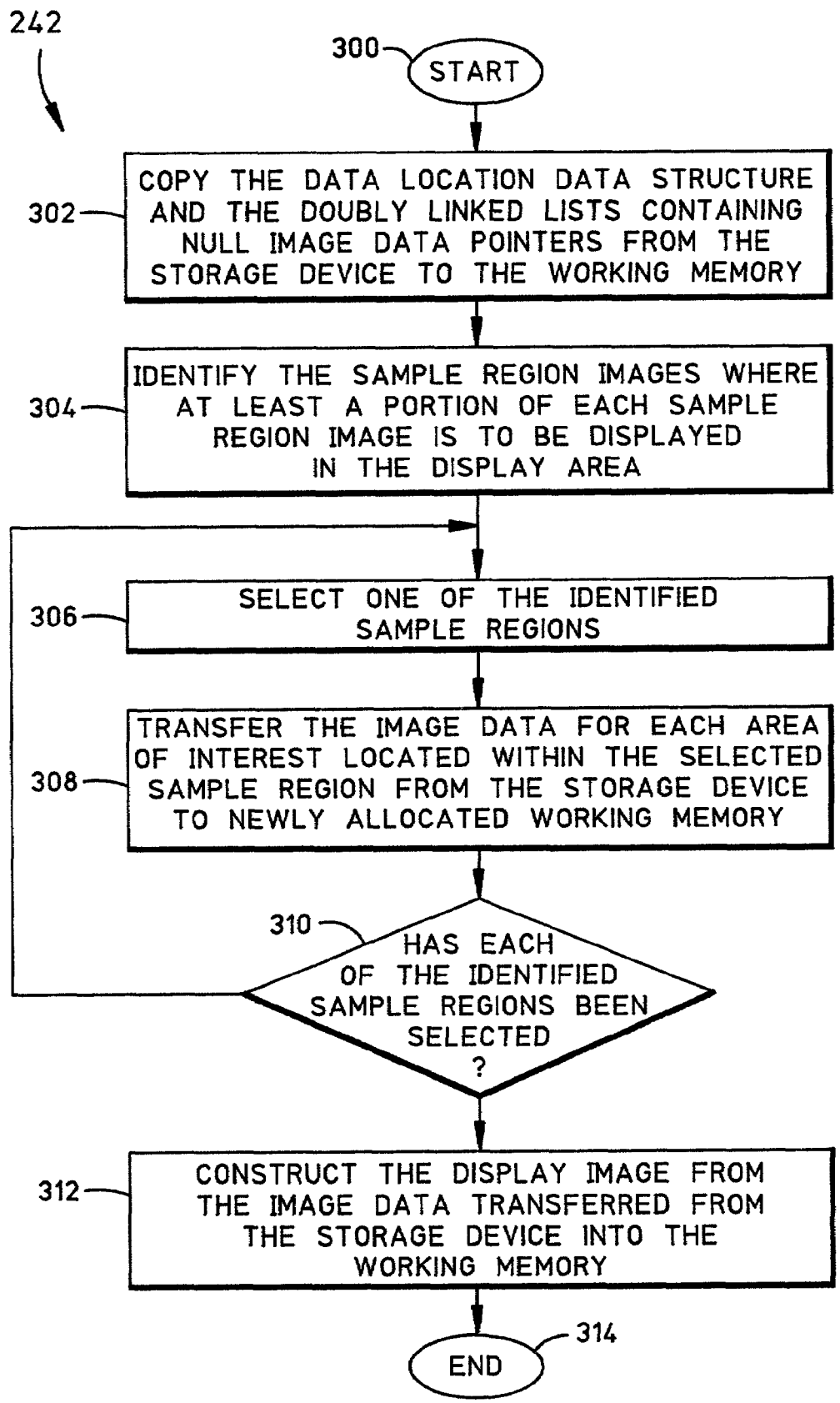
FIG. 12 illustrates a method for generating an initial display image.
Figure 13:
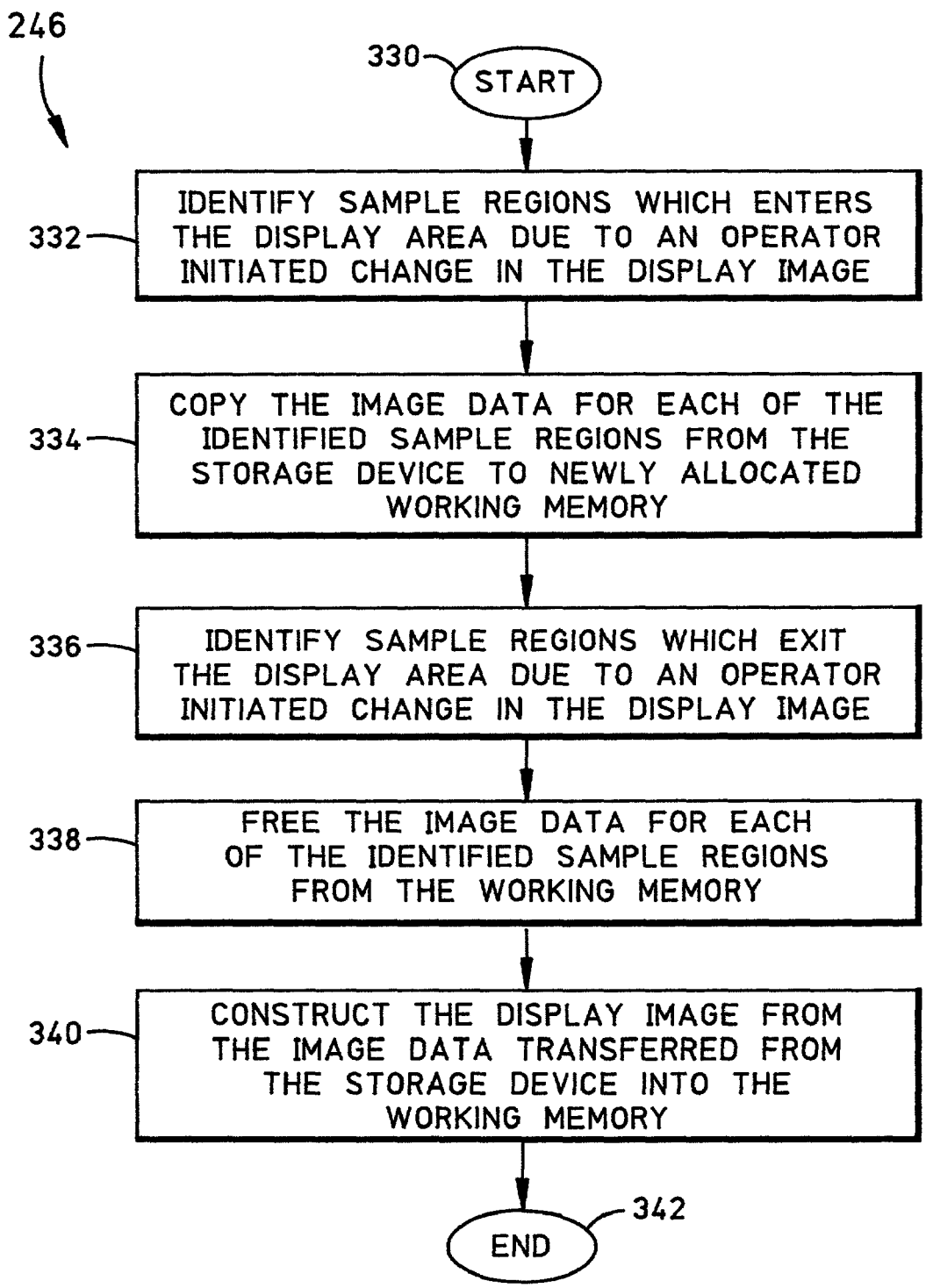
FIG. 13 illustrates a method for modifying a display image in response to operator initiated changes to the display image

FIG. 11 illustrates a method for managing an image of a biological specimen 14 on a display 22. The method begins at start block 240 when an operator uses a user interface to indicate to the processing unit 20 that he would like to view an image stored in the storage device. At process block 242 a portion of the image data is transferred from the storage device into the working memory. At least a portion of the transferred image data is used to generate an initial display image 72 on the display 22. FIG. 12 illustrates an embodiment of a method for generating the initial display image 72. At determination block 244 a determination is made whether the display image 72 has been scrolled into a region where image data is not concurrently residing in working memory. When the determination is positive the display image 72 is modified in accordance with the scrolling at process block 246. FIG. 13 illustrates a method for modifying a display image 72 in accordance with scrolling. Once the display image 72 has been appropriately modified, the method proceeds to determination block 248. Similarly, when the determination at determination block 244 is negative, the method proceeds to determination block 248.

At determination block 248 a determination is made whether the magnification of the display 22 has been adjusted. For instance, it is determined whether an operator has used a user interface to zoom in on the display image 72 or zoom out on the display image 72. When the determination is positive the display image 72 is modified in accordance with the changes to the magnification of the image at process block 250. FIG. 13 illustrates a method for modifying a display image 72 in accordance with changes in the display image 72 magnification. Once the display image 72 has been appropriately modified, the method proceeds to determination block 252. Similarly, when the determination at determination block 244 is negative, the method proceeds to determination block 252.

At determination block 252 a determination is made whether the display image 72 has been closed. For instance, has an operator used a user interface to indicate to the processing unit 20 that the image should be closed. When the determination is negative the method returns to process block 242. When the determination is positive the processing unit 20 makes a variety of memory adjustments at process block 254. For instance, the processing unit 20 copies the data location data structure 56 which is currently in the working memory into the storage device if necessary. Additionally, an indication of the last display image 72 can be stored in the storage device so the last display image can be viewed again when the image is displayed later. This indication can be independent of the data location data structure 56 or can be integral with the data location data structure 56. For instance, a flag can be placed in the primary element of each data location data structure 56 which is associated with a specimen region which was used in the last display image 72. Alternatively, data describing the position and dimensions of the last display image can be stored. The list can be used to re-create the display image 72 which was on the display 22 before it was closed by scanning the list to identify the specimen regions 40 for which image data should be transferred from the storage device to the working memory. The method terminates at end block 256.

FIG. 12 illustrates a method for displaying a portion of the image when the image is initially opened. The method begins at start block 300. At process block 302 the data location data structure 56 is created or transferred from the storage device to the working memory. The doubly linked list can contain null image data pointers. At process block 304 the specimen regions 40 to be displayed on the image display are identified. When the image has previously been opened, this identification can be made by looking at a list of the specimen regions 40 which were in use the last time the image was displayed. This list can be stored in the storage device as described with respect to process block 254 of FIG. 11. As will become more evident below, this list can be used so the generated display image 72 is the same as the display image 72 which was on the display 22 when the image was closed last. When the image is being opened for the first time, the processing unit 20 can use default settings to identify the specimen regions 40. Default settings can be administratively determined values for the degree of magnification, i.e. zoom in or zoom out, that the image is to have as well as the portion of the image which will be displayed. For instance, the processing unit 20 can be programmed to display 22 the upper left corner of the image at the default magnification.

Figure 14:
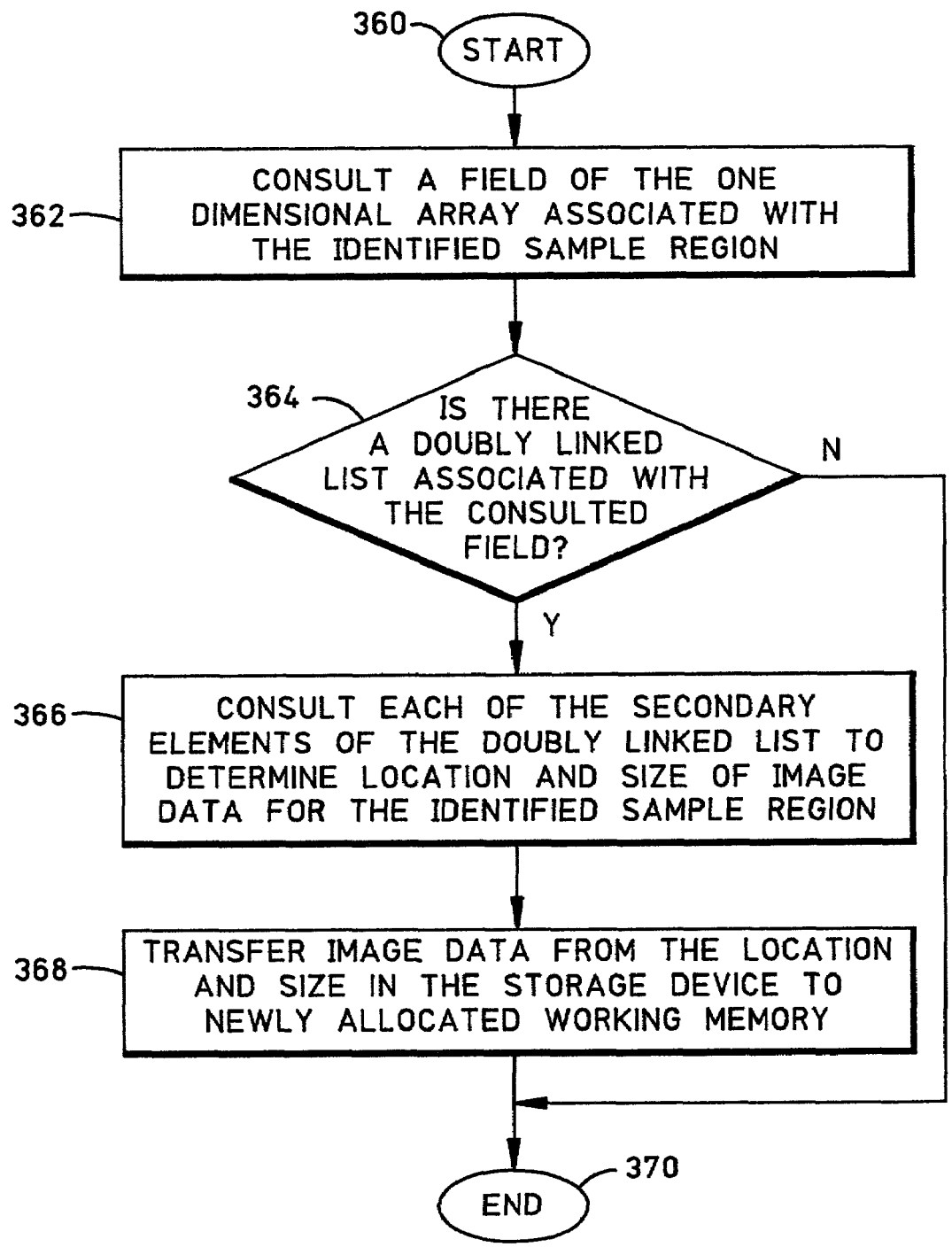
FIG. 14 illustrates a method for transferring the image data from the storage device to the working memory.

At process block 306 one of the identified specimen regions 40 is selected. At process block 308 the image data for the identified specimen region is transferred from the storage device to newly allocated working memory. The data receiving fields 70 in the secondary elements associated with the transferred data can be updated to point to the location of the transferred data in the working memory. A method for transferring data from the storage device to the working memory is illustrated in FIG. 14. At process block 310 a determination is made whether each specimen region has been selected at process block 306. When the determination is negative, the method returns to process block 306. When the determination is positive, the method proceeds to process block 312. At process block 312 the image data transferred from the storage device to the working memory is used to generate the display image 72. The method terminates at end block 314.

FIG. 13 illustrates a method for modifying a display image 72 in response to operator initiated changes in the display image 72. Suitable operator initiated changes include, but are not limited to, scrolling of the display image 72 so the operator can view another portion of the image and changing the magnification of the display image 72 to zoom in or zoom out on the image. The method begins at start block 330 when the processing unit 20 detects that the operator has employed a user interface to modify the image display.

At process block 332 the specimen regions 40 which enter the image display due to the operator initiated change are identified as discussed with respect to FIGS. 9A-9D. At process block 334 the image data for each of the identified specimen regions 40 are transferred from the storage device to the working memory. The data receiving field associated with each image data is updated to point to where the location of each image data in the working memory. FIG. 14 illustrates a method for transferring the image data from the storage device to the working memory. At process block 336 the specimen regions 40 which leave the image display due to the operator initiated change are identified. At process block 338 the image data for each of the identified specimen regions 40 are freed from the working memory. This data can be freed by freeing the image data pointed to by the data receiving fields 70 associated with the identified sample regions. The pointers in these data receiving fields 70 can also be nulled. At process block 340, a modified display image 72 is generated using the image data transferred from the storage device into the working memory. The method terminates at end block 342.

There are many possible variations to the method illustrated in FIG. 13. For instance, the modified display image 72 can be generated before the specimen regions 40 which exit the display region are identified.

FIG. 14 illustrates a method of transferring image data for a particular specimen region from the storage device to the working memory. The method begins at start block 360. At process block 362 a primary element of the data location data structure 56 is consulted. The consulted primary element is a field associated with a specimen region. As discussed above, each region is associated with a primary element in the data location data structure 56 by Equation 1. At decision block 364 a determination is made whether there is a doubly linked list is associated with the consulted primary element. When the determination is positive, each secondary element of the doubly linked list is consulted to determine the dimensions and location in the storage device of the image data for an area of interest in the specimen region. At process block 368 the image data at the location indicated within a secondary element of the doubly linked list is accessed from the storage device and transferred into newly allocated working memory. The address where the transferred data is located in the working memory is entered into the data receiving field 70.

Because FIG. 14 illustrates a method of transferring image data for a particular specimen region from the storage device to the working memory and many of the above methods require transferring the image data for one or more specimen regions 40, the method of FIG. 13 is repeated for each of the specimen regions 40 for which image data is to be transferred from the storage device to the working memory.

Many of the above discussions relate to specimen images 38 that have been modified to include only particular areas of interest, however, the methods of the present invention can be practiced without modifying the specimen image 38 by treating the entirety of each specimen region image 42 as an area of interest.

The above disclosures can be used to allow multiple portions of the image to be viewed on a display. For instance, multi-threading and/or multi-processing capabilities of modern computer operating systems can be utilized to operate on the same data location data structure to concurrently display more than one view of an image. The displayed images can be overlapping portions of the same specimen image 38 or can be independent portions of the specimen image 38.

Much of the above disclosure uses creation of a display image as an example of processing the specimen image. However, the invention can be used in conjunction with other specimen image processing functions. For instance, processing of the image can include, but is not limited to, image enhancements, identifying features on the image, making measurements and other processing. Examples of image enhancement include the image processing features in commercially available photo processing packages such as filtering, contrast adjustments, etc. Examples of feature identification include processes such as edge detection for identification of cells. Examples of measurements include counting the number of pixels above an intensity threshold or of a particular color. Each of these processing functions can be performed without generating a display image.

When processing the specimen image without generating a display image, the size and position of the processing region relative to the specimen image can be administratively entered. When it is desirable to process a portion of the specimen image that is larger than the size of the administratively entered processing region, the processing region can be scrolled around the specimen image until the desired portion of the specimen image has been processed. This scrolling can be a programmed scroll that is performed without generating a display image. Alternatively, the specimen image can be processed by positioning the processing region in adjacent positions on the specimen image until the desired portion of the specimen image is covered.

Although the above disclosure is applied to biological specimens, the disclosure can be applied to images of non-biological specimens. For instance, the specimens can be semiconductor wafer and/or integrated circuits. Accordingly, the disclosure can be useful for inspection of integrated circuits and other solid state applications.

Other embodiments, combinations and modifications of this invention will occur readily to those of ordinary skill in the art in view of these teachings.

Therefore, this invention is to be limited only by the following claims, which include all such embodiments and modifications when viewed in conjunction with the above specification and accompanying drawings.

What is claimed is:

1. A computer-executed method for processing a pixilated image of a biological specimen, comprising:
    receiving respective portions of the image in a sequence;
    storing a data structure with a plurality of first elements on a computer-readable memory device, each first element corresponding to a respective portion of the image, the first elements being arrayed in a sequence determined according to the sequence in which the corresponding portions of the image are received;
    processing a plurality of pixels in each portion of the image in order to identify any areas of interest within the portion of the image;
    for each identified area of interest within a portion of the image, linking the first element in the data structure that corresponds to the portion of the image in which the identified area of interest is located to a separate second element, and entering information into the second element, thereby facilitating the transfer of pixel data in the image of the identified area of interest from a location outside of the working memory into the working memory; and
    transferring into the working memory the information in the second element corresponding to at least one of the identified areas of interest; and
    displaying the pixel data of at least one of the identified areas of interest, which have been transferred into the working memory.

2. The method of claim 1, wherein the information entered into the second element includes a storage location in a storage device, the method further including storing the pixel data of a corresponding area of interest in the storage device at the storage location.

3. The method of claim 2, further including providing in each second element a field for receiving information identifying a location in the working memory for processing the pixel data of the area of interest that is linked with the second element.

4. The method of claim 2, further comprising:
    transferring the pixel data of the corresponding area of interest from the storage location to the working memory if the corresponding area of interest falls within a processing region of the image to be displayed.

5. The method of claim 1, wherein the areas of interest are identified by processing the fluorescence of the corresponding pixels.

6. The method of claim 1, wherein the areas of interest are identified by processing the brightness of the corresponding pixels.

7. The method of claim 1, wherein the areas of interest are identified by processing the color of the corresponding pixels.

8. The method of claim 1, wherein the areas of interest are identified by processing the fluorescence, brightness or color of the corresponding pixels.

9. The method of claim 1, further including assigning a default value to all pixels of the image which are not in any area of interest.

10. The method of claim 9, wherein the areas of interest are identified by processing the fluorescence of the corresponding pixels.

11. The method of claim 9, wherein the areas of interest are identified by processing the brightness of the corresponding pixels.

12. The method of claim 9, wherein the areas of interest are identified by processing the color of the corresponding pixels.

13. The method of claim 9, wherein the areas of interest are identified by processing the fluorescence, brightness or color of the corresponding pixels.

14. The method of claim 1, further comprising:
scanning a specimen, such that the sequence of the step of receiving the portions of the image corresponds to a sequence of the scanning.

15. The method of claim 14, further comprising:
identifying areas in the scanned specimen, which are represented by respective portions of the image, based on the arrayed sequential positioning of the corresponding first elements.

16. A computer program product including computer-executable program code embodied on a computer-readable memory device for causing a programmed computer to store a pixilated image by:
receiving respective portions of the image in a sequence;
storing a data structure with a plurality of first elements, each first element corresponding to a respective portion of the image, the first elements being arrayed in a sequence corresponding to the sequence in which the corresponding portions of the image are received;
processing a plurality of pixels in each portion of the image in order to identify any areas of interest within the portion of the image;
for each identified area of interest, linking the first element that corresponds to the portion of the image in which the identified area of interest is located to a separate second element, and entering information into the second element, thereby facilitating the transfer of pixal data in the image of the identified area of interest from a location outside of the working memory into the working memory to allow the pixel data of the identified area of interest to be processed; and
transferring into the working memory the information in the second element corresponding to at least one of the identified areas of interest; and
displaying the pixel data of at least one of the identified areas of interest, which have been transferred into the working memory.

17. The computer program product of claim 16, wherein the information entered into the second element includes a storage location in a storage device, the program product further causing the computer to store the pixilated image by storing the pixel data of a corresponding area of interest in the storage device at the storage location.

18. The computer program product of claim 17, the computer program product further for causing the computer to store the pixilated image by providing in each second element a field for receiving information identifying a location in the working memory for processing the pixel data of the area of interest that is linked with the second element.

19. The computer program product of claim 17, wherein the computer program product further causes the computer to:
transfer the pixel data of the corresponding area of interest from the storage location to the working memory in response to determining that the corresponding area of interest falls within a processing region of the image to be displayed.

20. The computer program product of claim 16, wherein the areas of interest are identified by processing the fluorescence of the corresponding pixels.

21. The computer program product of claim 16, wherein the areas of interest are identified by processing the brightness of the corresponding pixels.

22. The computer program product of claim 16, wherein the areas of interest are identified by processing the color of the corresponding pixels.

23. The computer program product of claim 16, wherein the areas of interest are identified by processing the fluorescence, brightness or color of the corresponding pixels.

24. The computer program product of claim 16, the computer program product further for causing the computer to store the pixilated image by assigning a default value to all pixels of the image which are not in any area of interest.

25. The computer program product of claim 24, wherein the areas of interest are identified by processing the fluorescence, brightness or color of the corresponding pixels.

26. The computer program product of claim 16, further comprising:
scanning a specimen, such that the sequence of the step of receiving the portions of the image corresponds to a sequence of the scanning.

27. The computer program product of claim 26, wherein the computer program product further causes the computer to:
identify areas in the scanned specimen, which are represented by respective portions of the image, based on the arrayed sequential positioning of the corresponding first elements.

28. A data structure embodied on a computer readable memory device, the data structure being processed by one or more computer processors to transfer areas of interest of an image into a working memory, the data structure comprising:
an array of primary elements corresponding to respective portions of the image, the position of each primary element in the array identifying the portion of the image corresponding to that primary element,
wherein, for each portion of the image identified as having at least one area of interest, the primary element corresponding to the identified portion of the image includes a link to at least one separate secondary element, the at least one secondary element specifying a location in a storage device where pixel data of the at least one area of interest resides, the specified location being outside of the working memory, and
wherein, when the image is received by the one or more computer processors, the data structure causes the one or more computer processors to process at least one portion of the image identified as having at least one area of interest by:
transferring the pixel data of the at least one area of interest from the specified location of the storage device into the working memory, and
displaying the transferred pixel data.

29. The data structure of claim 28, wherein, for each portion of the image identified as having a plurality of areas of interest, the corresponding primary element is linked with a plurality of secondary elements, each of the plurality of secondary elements specifying the location in the storage device where pixel data of a corresponding one of the plurality of areas of interest resides.

30. The data structure of claim 28, wherein one or more of the primary elements is not linked with any secondary elements.

31. The data structure of claim 28, wherein the image is stored in a region of the storage device and the location specified by each secondary element is within the region of the storage device in which the image is stored.

32. The data structure of claim 28, wherein each secondary element includes a first field indicating where the beginning of the image data for the area of interest is located in the storage element and a second field indicating the length of the image data.

33. The data structure of claim 28, wherein each primary element, which is linked to one or more secondary elements, includes a header for a doubly linked list comprising the one or more secondary elements.

34. A computer-executed method for processing a pixilated image of a biological specimen, comprising:

receiving respective portions of the image in a sequence and storing the received portions of the image in a storage device;

storing a data structure with a plurality of first elements on a computer-readable memory device, each first element corresponding to a respective portion of the image, the first elements being arrayed in a sequence determined according to the sequence in which the corresponding portions of the image are received;

within each portion of the image,
selecting pixels whose color, intensity, or wavelength satisfies a predetermined criteria, and
identifying areas of interest, which include at least one selected pixel;

for each identified area of interest within a portion of the image, linking the first element in the data structure that corresponds to the portion of the image in which the identified area of interest is located to a separate second element, and entering into the second element a location of the storage device in which pixel data of the identified area of interest resides;

processing the pixel data of a particular area of interest by looking up the corresponding second element to determine the corresponding location of the storage device and transferring the pixel data of the particular area of interest from the determined location of the storage device into the working memory; and displaying the pixel data transferred into the working memory.

35. A data structure embodied on a computer readable memory device, the data structure being processed by one or more computer processors to transfer areas of interest of an image into a working memory, the data structure comprising:

an array of primary elements corresponding to respective portions of the image, the position of each primary element in the array identifying the portion of the image corresponding to that primary element, wherein, for each portion of the image identified as having at least one area of interest, the primary element corresponding to the identified portion of the image includes a field containing a pointer to a list of at least one separate secondary element, the list of at least one secondary element specifying a location in a storage device where pixel data of the at least one area of interest resides, the specified location being outside of the working memory.

* * * * *